Jan. 12, 1971  A. M. ROCKWELL, JR  3,555,450
LASER WINDOW HAVING A METALLIC FRAME ARRANGED TO PERMIT
POST OPTICAL GRINDING AND POLISHING
Filed Jan. 22, 1968

INVENTOR.
ALBERT M. ROCKWELL
BY
Robert V. Dilts
ATTORNEY

+ # United States Patent Office 3,555,450
Patented Jan. 12, 1971

3,555,450
LASER WINDOW HAVING A METALLIC FRAME ARRANGED TO PERMIT POST OPTICAL GRINDING AND POLISHING
Albert M. Rockwell, Jr., Belmont, Calif., assignor, by mesne assignments, to Laser Associates, Bethel, Conn., a corporation of New York
Filed Jan. 22, 1968, Ser. No. 699,717
Int. Cl. H01s 3/02, 3/22
U.S. Cl. 331—94.5      5 Claims

ABSTRACT OF THE DISCLOSURE

A gas laser having an improved output window is disclosed. The improved optical window includes an optically transparent dielectric window member hermetically sealed at its periphery to a metallic frame member which in turn is sealed to a gas-tight envelope of the laser. The metallic frame member is arranged and dimensioned relative to the window member to have an overall thickness which is less than the thickness of the window member, whereby the optical faces of the window member, as sealed into the metallic frame, may be optically ground and polished without interference from the window frame member. In a preferred embodiment, the window frame member is made of sheet metal having a convolution therein for inhibiting transmission of stress through the frame member to the window member. In another embodiment of the present invention, the window member has a concave surface facing into the gas envelope of the laser. The concave surface is coated with an optically reflective coating to form a partially reflecting mirror defining one end wall of the laser's optical resonator as well as the output optical window for the coherent beam of the laser.

DESCRIPTION OF THE PRIOR ART

Heretofore, gas lasers have been built employing optically transparent windows. As used herein, the terminology "laser" refers to devices that provide coherent radiation lying in the infrared, visible and ultraviolet part of the electromagnetic spectrum, and the terminology "optical" refers to the infrared, visible and ultraviolet part of the electromagnetic spectrum. Such optically transparent window assemblies have typically included a window member formed by a flat slab of optically transparent material such as quartz, glass, sapphire, zinc-sulphide germanium, or zinc-selenide. The window member is typically hermetically sealed at its outer perimeter over the open end of a hollow tubular extension of the envelope of the gas laser. Several different techniques have been employed for joining the window member to the tubular envelope. For example, epoxy glue has been utilized for gluing the window member over the end of a tubular glass or quartz extension of the envelope. Other window assemblies have employed optically flat contacts, i.e., the window member is ground to an optical flatness and the tube to which it is to be joined is ground to an optical flatness and the two surfaces are pressed together to form a gas-tight seal therebetween. In still other windows, the quartz or glass window member has been fused to a quartz or glass tubular extension of the envelope. In still another prior art embodiment, the window member has been joined to the tubular envelope by means of a solder glass.

All of these prior art windows have had one or more drawbacks. For example, the window using epoxy cement cannot be subjected to a high temperature bake, i.e., 600° C., typically encountered during fabrication of the laser for outgassing the structure to prevent contamination of the lasing gas fill. In the case of the epoxy cement, the high temperature bake causes the epoxy to emit materials which will contaminate the surface of the window. The epoxy also outgases with time to contaminate the lasing gas fill. In addition, the epoxy may degrade to the point at which it can no longer provide a leak tight seal. The prior optical window utilizing optical fits between abutting surfaces to form the seal cannot tolerate drastic temperature changes, and such optically flat contacting surfaces are generally expensive and difficult to produce. As to the prior art windows which have been fused to the envelope, these windows are typically relatively expensive to produce and require that a part of the window material be softened by heating during the joining process. This heating of the window creates strains which can alter the surface of the window and disturb the wave front and/or plane of polarization of the laser beam, thereby drastically reducing the power output obtained from the laser. Windows sealed to the envelope by means of solder glass are easier to fabricate than fused windows but suffer from strains which can alter the surface figure and create disturbances of the wave front or plane of polarization of the laser beam transmitted through the window.

Therefore a need exists for a high temperature bakeable optical window which can be optically ground and polished after assembly in its frame structure.

SUMMARY OF THE PRESENT INVENTION

The principal object of the present invention is the provision of an improved optically transparent window structure.

One feature of the present invention is the provision, in an optically transparent window assembly, of a metallic frame member hermetically joined at the side edge perimeter of the window member and such frame member having an overall thickness less than the thickness of the window member whereby the optical faces of the window member, as joined in the metallic frame, may be optically ground and polished without interference from the frame member.

Another feature of the present invention is the same as the preceding feature wherein the frame member is formed of sheet metal having a convolution therein for inhibiting transmission of stress through the frame to the window during subsequent joining to the laser.

Another feature of the present invention is the same as any one or more of the preceding features wherein a metallized layer is formed on the peripheral side edge of the window member, and wherein a metallic frame member is brazed to the window member via the intermediary of the metallized layer.

Another feature of the present invention is the same as any one or more of the preceding features wherein the optical window assembly is hermetically sealed over one end of an elongated gas discharged tube of a laser for passing the beam of the laser to the exterior of the discharge tube.

Another feature of the present invention is the same as the preceding feature wherein the window member has a concave surface facing into the gas envelope of the laser, and an optically reflective coating is provided on the concave face to form a partially reflecting mirror defining one end wall of an optical resonator of the laser as well as the output window for the coherent laser beam.

Other features and advantages of the present invention will become apparent upon a perusal of the following specification taken in connection with the accompanying drawings wherein:

DESCRIPTION OF THE PREFERRED EMBODIMENTS

Figure 1:
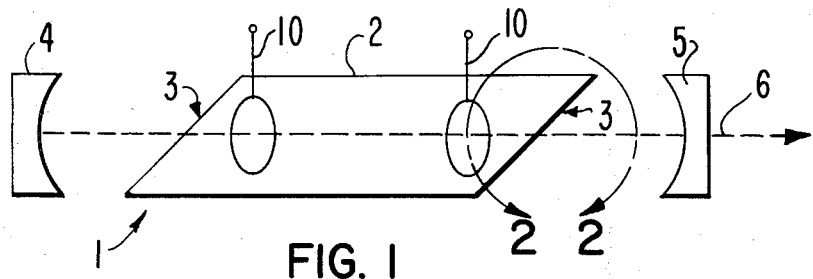
FIG. 1 is a schematic line diagram of a laser incorporating features of the present invention.

Referring now to FIG. 1 there is shown a CW gas laser oscillator 1, such as a helium-neon gas laser. The gas laser 1 includes an elongated tubular gas-tight envelope 2 first evacuated to a very low pressure as of $10^{-8}$ torr and then filled with the lasing gas fill such as helium-neon gas to a suitable subatmospheric pressure. The envelope 2 is conveniently made of quartz, ceramic or metal and includes a pair of Brewster-angle, optically transparent window assemblies 3 at opposite ends thereof. A cathode and anode electrode structure 10 is contained within the envelope 2 for exciting an electrical discharge in the gaseous medium. Optical radiation emitted from the discharge passes in a beam axially through the Brewster-angle windows 3 to a pair of mirrors 4 and 5 axially spaced apart to define an optical resonator having a resonant frequency at the optical wavelength of the radiation emitted by the gaseous discharge. Mirror 5 is made only partially reflecting so that a small percentage of the optical radiation falling on the mirror 5 passes through the mirror to form the output beam 6 of the laser 1. The light reflecting back and forth between the axially aligned mirrors 4 and 5 through the discharge tube 2 produces a coherent emission of optical radiation to form a coherent beam 6. In a typical example of a helium-neon laser, the output laser beam is at a wavelength of approximately 6328 A.

Figure 2:
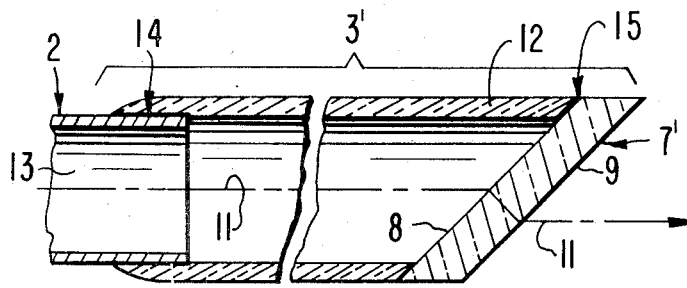
FIG. 2 is an enlarged longitudinal sectional view of a portion of a prior art optical resonator, such as delineated by line 2—2 of FIG. 1, illustrating how the prior are optical elements is joined to the discharge tube structure.

Referring now to FIG. 2 there is shown a prior art Brewster-angle optical window assembly 3'. Briefly, the window assembly 3' includes an elliptically shaped slab of optically transparent material 7, as of quartz, glass, sapphire, zinc-sulphide germanium, or zinc-selenide. The window member 7 includes a pair of optically flat faces 8 and 9 with the plane of the optical faces 8 and 9 disposed at the Brewster-angle with respect to the axis of the light beam 11 in order to minimize reflection of light from the faces of the window 7. The window member 7 is hermetically sealed over the end of a hollow cylindrical quartz tube 12 which is graded back to a metal tube 13 as of Kovar which in turn is joined as by brazing, to the vacuum envelope 2.

The Kovar tube 13 is sealed to the quartz tube 12 by means of a conventional fused glass joint 14. The quartz tube 12 is sealed to the quartz window 7 by means of a fused joint 15. Typically, the optical surfaces 8 and 9 are polished smooth to remove blemishes and irregularities greater than $\frac{1}{20}$ of a wavelength of the coherent radiation forming the laser beam 11, such coherent radiation being within the range of $2 \times 10^3$ to $10^6$ A. in wavelength. In addition, the surfaces 8 and 9 are parallel to approximately 1 wavelength over the entire surface of the window. When the fused joint 15 is made for sealing the window 7 to the tube 12, distortion is quite often produced in the parallelism of the faces 8 and 9. In addition, strains are introduced into the window 7. Such strains tend to locally rotate the plane of polarization of light and create different apparent pathlengths through the window. Such strains produce the same effect as though the faces 8 and 9 were out of parallelism and result in a reduced power output for the laser. A typical prior art laser 1 is described and claimed in my copending U.S. application 641,965 filed May 29, 1967 and assigned to the same assignee as the present invention.

Figure 3:
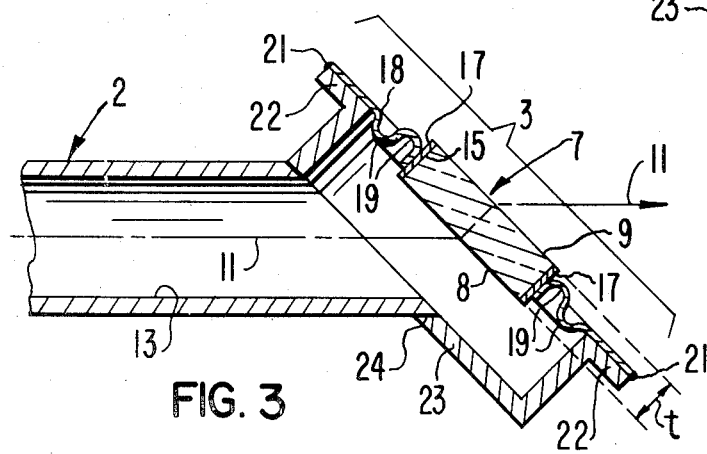
FIG. 3 is a view similar to that of FIG. 2 depicting art optical element is joined to the discharge tube structure the present invention.

Referring now to FIG. 3 there is shown an optical window assembly 3 incorporating features of the present invention. The window assembly 3 includes an optical window member 7 which may be made of any one of the previously described optically transparent window materials. In a typical example, the window 7 is a circular disc 0.625" in diameter and approximately 0.125" thick and made of sapphire. A metallized layer 17 is formed on the peripheral side edge 15 of the window disc 7 by conventional metallizing techniques such as sputtering, evaporation, or by sintering a metallizing paint consisting of a mixture of molybdenum and manganese powders. A relatively thin sheet metal window frame member 18 is brazed to the metallized side edge 17 of the window member 7. A suitable material for frame member 18 includes a sheet of copper, nickel or Kovar to a thickness of 0.005" to 0.025". One or more convolutions 19 are formed in the frame member 18 to prevent stresses from being transmitted through the frame member 18 to the window member 7.

The annular metallic frame 18 is sealed at its periphery 21, as by heliarc welding or by brazing, to a lip 22 formed on a cylindrical cup-shaped housing member 3. The housing member 23 is sealed at its bottom 24 to the end of a hollow tubular member 13 forming a portion of the vacuum envelope 2. The mounting lip 22 of the cup housing 23 defines a plane at the Brewster-angle with respect to the axis of the beam 11 of the laser.

The window frame member 18 has an overall thickness which is less than the thickness $t$ of the window member 7. In addition, even with the convolutions 19, the window frame member 18 is contained within a region of space which is bounded by the space defined between lateral extensions of the opposed faces 8 and 9 of the window member 7. When such is the case, the optical faces 8 and 9 of the window member 7, as sealed into the metallic frame 18, may be optically ground and polished without interference from the frame member 18. Thus, the subassembly including the window member 7 and the frame 18 may be assembled and then the optical faces 8 and 9 may be ground and polished to remove any surface contamination and to assure the optical flatness of the faces 8 and 9. If desired, the subassembly may be heat treated to remove any thermal stresses generated in the window member 7 during the brazing and metallizing steps required for sealing the frame 18 to the window member 7. The subassembly is then sealed to the lip 22 of the cup 23 is a gas-tight manner. The envelope 2 containing the window assemblies 3 at opposite ends thereof is then baked at 600° C. and evacuated to a very low pressure as of $10^{-8}$ torr to produce thorough outgassing of the envelope and associated parts before the envelope is filled with the lasing gaseous medium.

The convolutions 19 prevent stresses generated during the thermal cycling of the envelope 2 from being stansmitted through the frame 18 to the window member 7. Thus, distortion in the optical flatness and parallelism of the faces 8 and 9 of the window member 7 is prevented in use.

Figure 4:
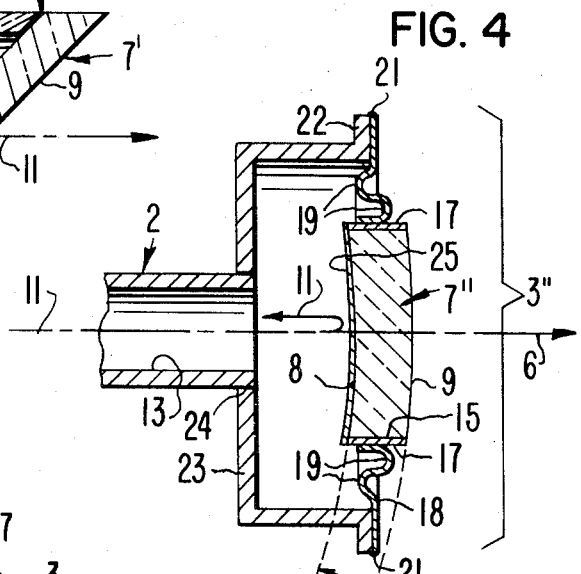
FIG. 4 is a longitudinal sectional view of a combined optical window and reflecting mirror for defining one end wall of an optical resonator incorporating features of the present invention.

Referring now to FIG. 4 there is shown an alternative embodiment of the present invention. In this embodiment, the function of the optical window assembly 3 is combined with the function of the mirror 5. The window assembly 3" is essentially identical to that of FIG. 3 with the exception that the cup-shaped member 23 is mounted with its axis coaxially aligned with the beam path 11 such that the plane of the window 7" is substantially perpendicular to the beam axis 11. In addition, the optical faces 8 and 9 of the window 7" are ground to a radius of curvature of order of magnitude 1 meter and 3 meters respectively rather than being optically flat. However, these relatively large radii of curvature are substantially planar over the relatively small surface of the window 7″ such that the window frame member 18 is contained within the thickness of the window member 7″ and does not interfere with post grinding and polishing of the window 7″ after it has been assembled into the window frame member 18.

The inside concave surface 8 of the window 7″ is coated with an optically reflective coating 25 which partially reflects the incident optical radiation while permitting a fraction of the incident radiation to pass through the window member 7″ to form the output beam 6. The partially reflective coating 25 defines one end wall of the optical resonator of the laser 1. A similar window assembly 3″ is disposed at the opposite end of the envelope 2 except that the reflective coating 25 in this case is totally reflecting to define the other end wall of the optical resonator.

Figure 5:
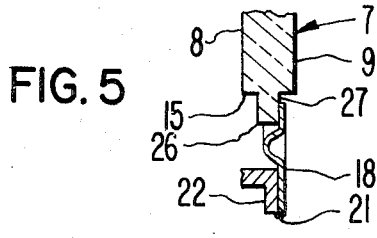
FIG. 5 depicts an alternate embodiment of the optical window assembly of the present invention.

FIG. 5 illustrates another embodiment of the optical window assembly 3 of the present invention. In this embodiment, the frame member 18 is secured at the side edge 15 of the window member 7 by sealing it to a shoulder 26 circumjacent to the window member 7 and extending from the side edge 15. The shoulder 26 may be formed from the window material to be integral with the window member 7. The shoulder 26 has a surface 27 for joining to the frame member 18 recessed below the face 9 a distance at least greater than the thickness of the sheet forming the frame member 18. Although metallizing techniques have been described hereinbefore to seal the frame member 18 to the window member 7, solder glass and other bonding agents may be employed to construct the window assembly 3 of the present invention. For example, solder glass could be employed to seal the frame member 18 to the surface 27 of the shoulder 26.

While the present invention has been described in detail with respect to particular embodiments, it is apparent that various modifications are possible within the scope of the present invention. Hence, the present invention is not to be limited except by the terms of the following claims.

What is claimed is:

1. In an optical window assembly, means forming an optically transparent window member having a pair of optically smooth faces on opposite sides of said window member, the improvement comprising, a sheet metal frame member hermetically sealed to said window member at the side edge perimeter of said window member, said frame member having a convolution therein encircling the periphery of said window member, and said frame being confined to a region of space which is bounded by the space defined between lateral extensions of the opposed faces of said window member, whereby the optical faces of said window member, as sealed into said frame, may be optically ground and polished without interference from said frame member.

2. The apparatus of claim 1, including means forming an elongated envelope having a gaseous atmosphere contained therein, means for exciting an electrical discharge in said gas to produce a beam of coherent light, and wherein said optical window and frame members are hermetically sealed over at least one end of said envelope to permit the coherent light beam to pass through said window member.

3. The apparatus of claim 2 wherein said window member has a concave surface facing into said envelope, an optically reflective coating formed on said concave face to form a partially reflective mirror defining one end wall of an optical resonator as well as the output optical window for the coherent light beam.

4. The apparatus of claim 1 wherein said frame member is metallic and is sealed to said window member by a metallized layer formed on the peripheral side edge of said window member, and wherein said metallic frame member is brazed to said window member via the intermediary of said metallized layer.

5. The apparatus of claim 1 wherein said frame member is sealed to said window member by a shoulder circumjacent to and extending from the side edge perimeter of said window member, said shoulder having a surface recessed from the face of the window member a distance at least equal to the thickness of the material forming the frame member, and bond means hermetically sealing said frame member to said recessed surface of said shoulder.

References Cited

UNITED STATES PATENTS 3,420,603   1/1969   Whilems _____ 331—94.5X

FOREIGN PATENTS 1,013,725   12/1965   Great Britain _____ 331—94.5
1,347,722   11/1963   France _____ 331—94.5
1,435,484   3/1966   France _____ 350—310

RONALD L. WIBERT, Primary Examiner

R. J. WEBSTER, Assistant Examiner

U.S. Cl. X.R.

350—310, 319